United States Patent
Raphael et al.

(10) Patent No.: US 7,486,231 B2
(45) Date of Patent: Feb. 3, 2009

(54) GPS DEVICE

(75) Inventors: Anthony Stephen Raphael, Teddington Middx (GB); Tai Dossaji, New Barnet (GB)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/584,428

(22) PCT Filed: Dec. 16, 2004

(86) PCT No.: PCT/IB2004/004250

§ 371 (c)(1),
(2), (4) Date: May 2, 2007

(87) PCT Pub. No.: WO2005/062065

PCT Pub. Date: Jul. 7, 2005

(65) Prior Publication Data

US 2007/0273502 A1    Nov. 29, 2007

(30) Foreign Application Priority Data

Dec. 19, 2003  (GB) ................................. 0329497.2

(51) Int. Cl.
*G01S 1/02* (2006.01)
(52) U.S. Cl. ........................... 342/357.06; 342/357.01; 342/357.12
(58) Field of Classification Search ................. 342/356, 342/357.01, 357.06, 357.1, 357.12; 701/207, 701/213, 215

See application file for complete search history.

(56) References Cited

U.S. PATENT DOCUMENTS

| 5,592,173 A | 1/1997 | Lau et al. |
| 6,122,506 A | 9/2000 | Lau et al. |
| 2001/0034210 A1 | 10/2001 | Nir et al. |

FOREIGN PATENT DOCUMENTS

| EP | 1 092 987 | 4/2001 |
| EP | 1 130 415 | 9/2001 |
| EP | 1 229 344 | 8/2002 |
| GB | 2 394 134 | 4/2004 |

*Primary Examiner*—Dao L Phan
(74) *Attorney, Agent, or Firm*—Foley & Lardner, LLP

(57) ABSTRACT

A GPS device comprising: a first circuit arranged to receive at least one first signal and arranged to output first timing information dependent on the first signal; a second circuit arranged to receive at least one second signal and arranged to output second timing information dependent of the second signal; and a third circuit arranged to determine timing information of the device. The third circuit is arranged to receive at least one of the first and second timing information, and further arranged to produce third timing information dependent on at least one of the first and second signals. The third circuit further is arranged to produce a location estimate dependent on the first and third timing information. The third timing information is initially synchronized to the first timing information and maintained substantially synchronized to the at least one first signal using the second timing information.

23 Claims, 7 Drawing Sheets

GPS DEVICE

FIELD OF THE INVENTION

The present invention relates to a timing synchronization method, in particular but not exclusively for use in a communications system for synchronizing location signals in a cellular wireless system.

BACKGROUND OF THE INVENTION

Wireless cellular communication networks and their operation are generally well known. In such a system the area covered by the network is divided into cells. Each cell is provided with a base station, which is arranged to communicate with a plurality of mobile stations or other user equipment in a cell associated with the base station.

In these known systems, it is possible to locate a mobile station with reference to a base station, and therefore possible to locate a mobile station within the operational transmission range of a base station.

As is also known additional location information can be determined by measuring the time between transmission and reception of a signal between a mobile station and a known base station or transmitter. Using such time of arrival (TOA) methods with signals transmitted from base stations it is possible to locate a mobile station within tens of metres.

Using the base station to transmit timing signals and using these signals to determine a positional estimate produces an estimate containing several potential errors and problems One of the major problems is the many different paths that the transmissions from the base station to the mobile station can take. The path can be direct, which provides an accurate estimation of the distance between the base and mobile stations or the path can be diffracted or reflected by man-made or natural phenomena such as buildings, large vehicles and hills. These indirect paths do not reflect the true distance between the base station and the mobile station and therefore produce location estimation errors. These diffracted and reflected signal paths occur more frequently in built-up and urban environments, thus degrading the more accurate base station location estimations due to the increased density of base stations.

A separate development in location estimation has been the development of a global positioning satellite (GPS) system which enables a GPS receiver to accurately locate its position within a few metres by measuring the transit time of signals received from satellites orbiting the earth. In basic terms the GPS system relies on both the transmitter (the orbiting satellites) and the receiver to have prior knowledge of a transmitted sequence, for their clocks to be substantially synchronized, and for the receiver to make measurements of a number of different satellite transmissions. The receiver calculates the time difference between the different satellite transmissions, and multiplying by the speed of light can calculate its own position in relation to that of the satellites. Additionally the receiver must have further information including the orbits (and hence position) of the satellites at any given time (this can be decoded from the satellite transmissions if necessary). Armed with this information, the time difference measurements and the absolute time at which the measurements are applicable, the receiver's position can be computed.

As is known in the art the GPS orbiting satellites are accurately synchronized 'to GPS System time' each carrying an accurate very stable atomic clock. Furthermore the constellation of satellites is monitored from controlling ground stations and any timing errors detected are effectively corrected.

As the cost of supplying each GPS receiver with an accurate and stable clock oscillator such as an atomic clock is prohibitive. Fortunately, this requirement can be mitigated, allowing the use of inexpensive oscillators. This comes at the expense of a common time error affecting the transit time measurements for all satellites equally. The common timing error is known as receiver clock bias and becomes a fourth unknown along with the 3-D position coordinates. This fourth unknown means that the receiver must therefore make measurements of a minimum of four satellite vehicles (SVs) in order to resolve both position and accurate GPS system time.

A further development in location estimation has been the development of assisted GPS (A-GPS). The idea here being that information such as the position of the satellites, rough receiver position, and fairly accurate GPS system time are passed to the receiver in order to speed up the time taken to make a position fix, and furthermore, as is known in the art, to increase the likelihood of measuring the time difference of the visible satellite transmissions and successfully obtaining a position fix at all. An example of A-GPS can be found in certain cellular networks where an entity on the cellular network side may at times provide assistance data to a mobile station.

Although the provision of accurate GPS system time in the assistance data set is highly desirable, it is likely that in many cellular networks supporting A-GPS, this particular information will not be available due to the additional network infrastructure that it implies. In this scenario it is then necessary for the mobile station's GPS receiver to decode GPS system time from a satellite data transmission. Unfortunately this activity requires higher signal strength (reducing the chances of obtaining a fix, especially in weak signal areas) and may take a number of seconds to complete. This not only contributes to the overall time to compute a positional fix, but also means that the receiver is active for longer, and hence more power is consumed. Power consumption is an important consideration in a mobile device.

As the elapsed time taken to decode and synchronize to GPS system time can be quite a few seconds (and may not even be possible in weak signal areas), it is highly desirable that once synchronization is achieved, the receiver is able to maintain GPS time even when it is not making a fix and the RF circuitry of the receiver is inactive. This is usually taken care of by a local clock oscillator and associated counter circuitry. The accuracy of the oscillator will determine for how long the local clock remains sufficiently synchronized to 'real GPS system time' in order to be useful.

As is mentioned above, cellular mobile stations may be equipped with GPS receiver modules in order to improve the location estimation capacity of the mobile station.

The cost sensitive nature of mobile stations tends to preclude the inclusion of expensive clock oscillators, and the type of oscillators used are by themselves too inaccurate to perform the role of maintaining synchronization to GPS System time for any length of time. With incremental errors of the order of several parts per million, sufficiently accurate synchronization will be lost in a matter of minutes.

The mobile station could of course re-acquire GPS time by turning on the GPS receiver, but to perform this exercise every few minutes would be a significant drain on the battery and somewhat negate the benefit of maintaining accurate GPS system time locally.

U.S. Pat. No. 5,945,944 describes a combined GPS receiver and mobile station transceiver, wherein the GPS timing information is determined by signals received from the base station, which is then transmitted via a communications link to be processed by a separate base unit. The positional estimate of the mobile station is not immediately available to the mobile station.

U.S. Pat. No. 6,346,911 describes a method of determining GPS time by capturing GPS data and locating a predetermined code sequence within the captured GPS data and the time difference between the captured data start and the start of the located predetermined code.

U.S. Pat. No. 6,150,980 describes a method of determining the time for a GPS receiver. Timing signals derived from a communication system are received by a GPS receiver and decoded to provide accurate time information.

SUMMARY OF THE INVENTION

It is an aim of the embodiments of the present invention to address or partially mitigate one of the more of the problems discussed previously.

There is provided according to a first aspect of the present invention a GPS device comprising: a first circuit arranged to receive at least one first signal and arranged to output first timing information dependent on said first signal; a second circuit arranged to receive at least one second signal and arranged to output second timing information dependent on said second signal; and a third circuit arranged to determine timing information of said device, said third circuit arranged to receive at least one of said first and second timing information, and further arranged to produce a third timing information dependent on at least one of said received first and second signals, wherein said third circuit is further arranged to produce a location estimate dependent on said first and third timing information; and wherein said third timing information is initially synchronized to said first timing information and maintained substantially synchronized to said at least one first signal using said second timing information.

The first signal may comprise a Global Positioning Satellite system signal.

The second signal may comprise a cellular network control or communications signal.

The first timing information may comprise at least one of: a demodulated Global Positioning Satellite system time; at least one Global Positioning Satellite system pseudo-range; a demodulated Global Positioning Satellite system timing data word.

The second timing information may comprise at least one of: cellular network base station symbol timing; cellular network base station frame timing.

The first circuit may comprise a Global Positioning Satellite receiver.

The second circuit may comprise a cellular network receiver.

The third circuit may comprise: a GPS demodulator; a timing estimator; a location estimator; and a clock register.

The first circuit may further comprise: a GPS demodulator; and a timing estimator.

The third circuit may comprise: a location estimator and a clock register.

The third circuit may comprise a cellular reference clock and wherein said third timing information may be further maintained substantially synchronized to said at least one first signal using said cellular reference clock.

The second and third circuit may be implemented in a single circuit.

The device may further comprise a threshold circuit arranged to further substantially synchronize said third timing information to said at least one first signal dependent on a threshold event.

The threshold circuit may be arranged to further substantially synchronize said third timing information using said first timing information.

The threshold event may comprise at least one of: a time period; a movement of said device out of a building; a movement of said device following a period of relative static nature; a determined number of base station handovers; a received first signal strength threshold; a number of received first signals.

A integrated circuit may comprise a GPS device.

The clock register may comprise random access memory.

According to a second embodiment of the present invention there is provided a method for determining the position of a device using GPS comprising: receiving at least one first signal; producing first timing information dependent on said at least one first signal; receiving at least one second signal; producing second timing information dependent on said at least one second signal; producing third timing information dependent on said at least one of said first and second timing information; initially synchronizing said third timing information to said first signal and maintaining synchronization to said first signal using said second timing information, and determining a location of said device dependent on said first timing information and said third timing information, wherein said determining step comprises the step of calculating a difference between said third timing information and said first timing information to determine location estimates.

The step of receiving at least one first signal may comprise; receiving at least four GPS signals.

The step of producing at least one first timing information may further comprise; processing said at least four received GPS signals to determine at least four GPS timing signals; processing said at least four GPS timing signals to produce a true GPS timing signal.

The step of receiving at least one second signal may comprise; receiving at least one communications or control signal from a wireless cellular communications system base station.

The step of producing said third timing information may comprises a further step of triggering a threshold circuit arranged to further substantially synchronize said third timing information to said at least one first signal dependent on a threshold event.

The further step of triggering said threshold circuit may be arranged to further substantially synchronize said third timing information using said first timing information.

The step of triggering said threshold circuit may further comprise the detection of a threshold event, possibly comprising at least one of: a time period; a movement of said device out of a building; a movement of said device following a period of relative static nature; a determined number of base station handovers; a received first signal strength threshold; a number of received first signals.

BRIEF DESCRIPTION OF THE DRAWINGS

For a better understanding of the present invention and how the same may be carried into effect, reference will now be made by way of example only to the accompanying drawings in which.

DETAILED DESCRIPTION OF EMBODIMENTS

Figure 1:
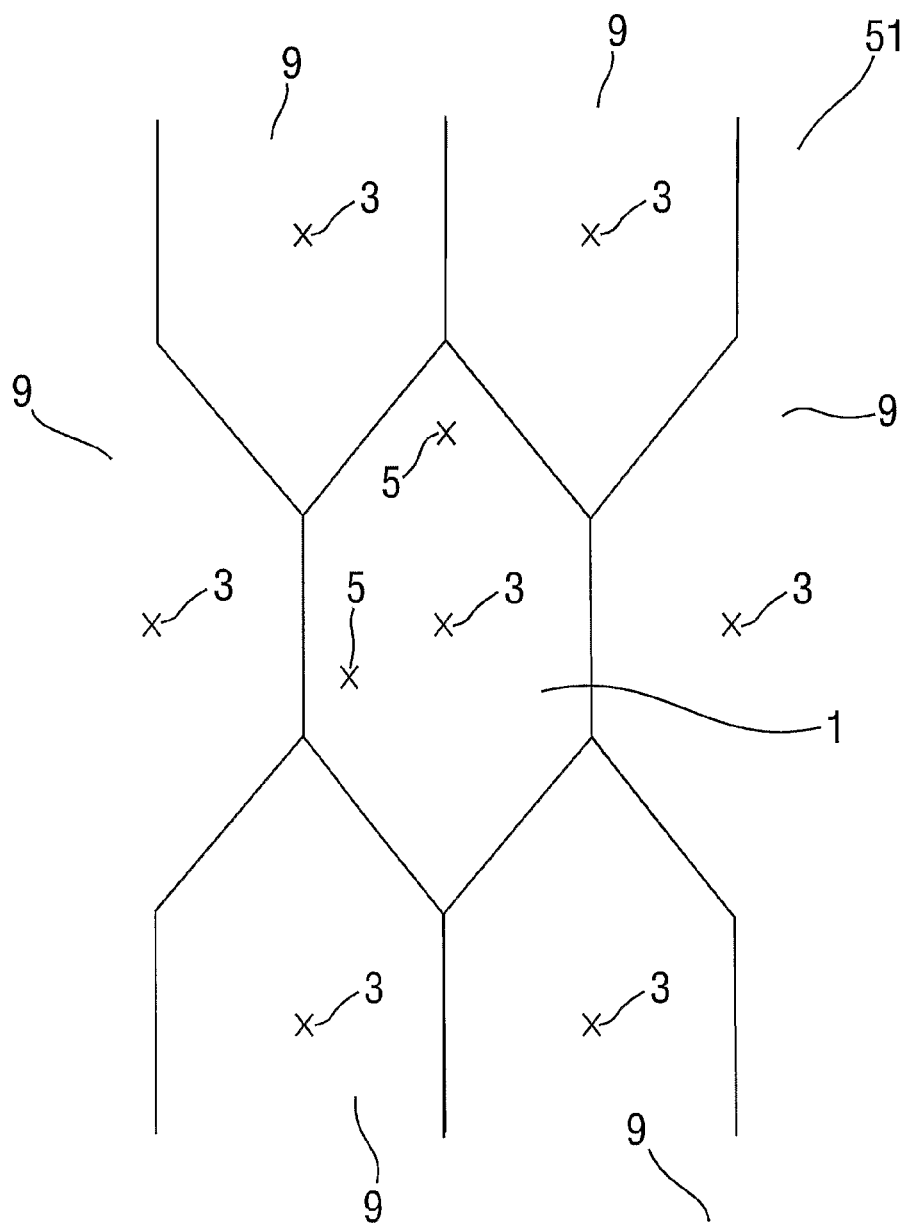
FIG. 1 shows a schematic view of a typical cell layout of a cellular network, in which embodiments of the present invention can be implemented.

Reference is made to FIG. 1, which shows part of a cellular telecommunications network 51 in which embodiments of the present invention can be implemented. The area covered by the network is divided into a plurality of cells 1, 9. FIG. 1 shows a central cell 1 surrounded by six partial cells 9. Further cells bordering these cells are not shown for clarity. Each cell has associated therewith a base transceiver station 3 also known as a base station. The base station 3 is arranged to communicate with mobile devices or other user equipment 5 associated with the base station 3. Examples of mobile devices include mobile telephones, personal digital assistants (PDA) with transceiver capabilities, and laptops with transceiver capabilities. These mobile devices 5 are also known as mobile stations.

The cells may overlap at least partially or totally. In some systems, these cells may have a different shape to that illustrated. In some embodiments the base stations 3 may communicate with mobile devices 5 outside their associated cell. In other embodiments mobile devices 5 may communicate with mobile devices 5 directly and without recourse to the base station 3. In other embodiments of the invention base station 3 may communicate with another base station 3 directly.

Communication between the mobile station 5 and the base station 3 within a cell is synchronized to both the symbols and frames transmitted by the base station 3. As in known in the art the base station 3 derives its timing from a clock accurate and stable to within a fraction of a part per million. The mobile station 5 receives the base station signals and uses the base station signals to synchronize its own internal clock and timings to that of the base station.

As is known in the art, code division multiple access (CDMA) network standards used in the United States are synchronized with the GPS timing sequence, other communication standards such as the global system for mobile communications (GSM) and wideband code division multiple access (WCDMA) do not provide a base station timing synchronized to GPS time, and are therefore considered to be asynchronous with respect to GPS time. Furthermore the base stations and their timing can be considered to be asynchronous to one another.

Figure 2:
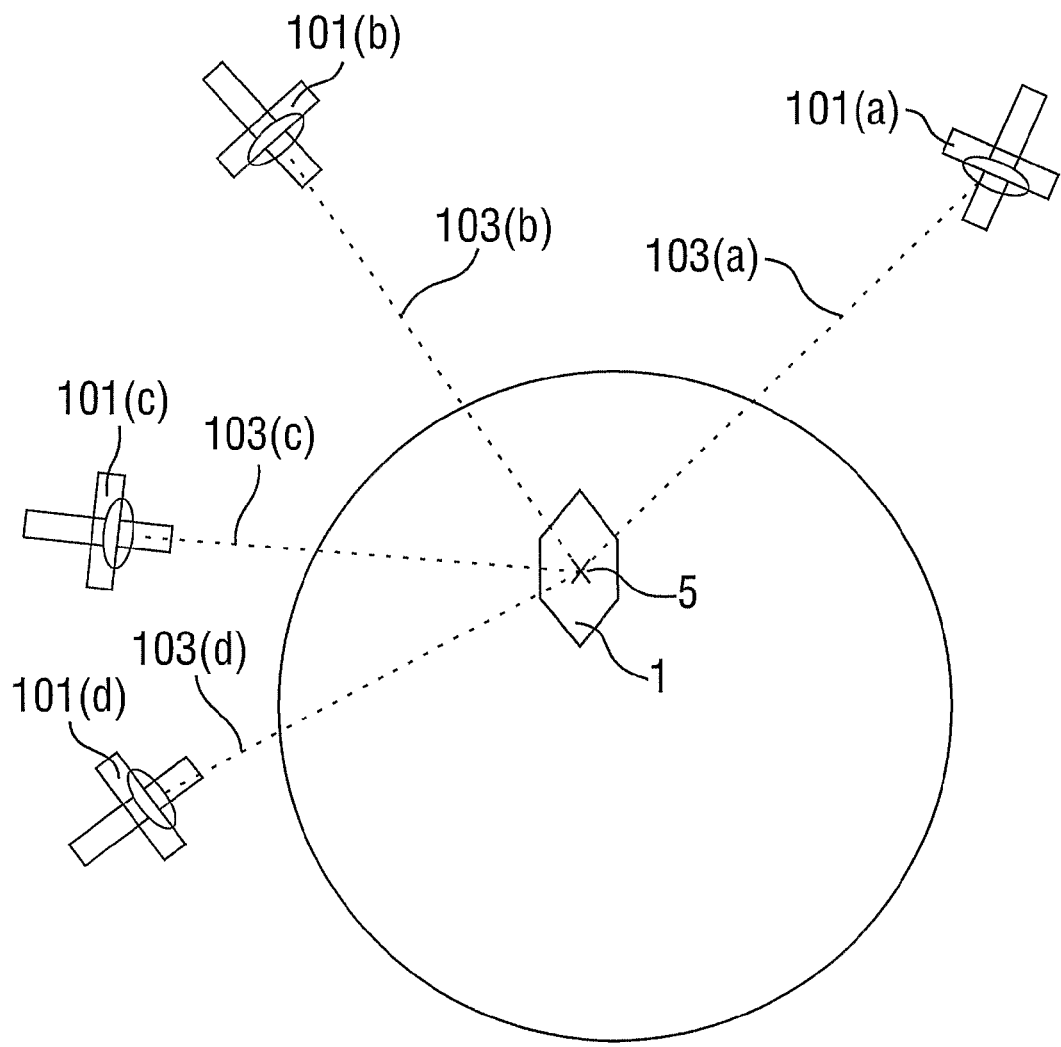
FIG. 2 shows a schematic view of a Global Positional Satellite (GPS) system, in which embodiments of the present invention can be implemented.

FIG. 2 shows a schematic view of a typical GPS system. A GPS receiver or mobile station 5 uses an antenna to receive signals 103 from orbiting satellites 101. In FIG. 2 the mobile station 5 can "see" four of the constellation of orbiting satellites 101(a), 101(b), 101(c), 101(d). Each of the satellites transmits signals 103(a), 103(b), 103(c), 103(d).

These signals are made up of subframes. Each subframe comprises a 50 bit per second data sequence. This 50 bit per second data sequence comprises a known preamble, a Time of Week (ToW), and a Subframe ID. The preamble is a predetermined eight bit identifier at the beginning of every subframe, and a two bit (00) sequence at the end of every subframe, which is the same for all of the satellites. The Time of Week signal is a seventeen bit sequence which accurately defines the time of the start of the current subframe.

In order that this signal is capable of being received at very low power levels and still be extracted from the background noise the data sequence is modulated using a known pseudorandom timing sequence. This pseudorandom sequence also known as the gold code is 1023 bits long and is transmitted at 1.023 Mhz, in other words the code sequence repeats 20 times per data bit. As this higher frequency signal is coherent with the data bit stream it can be possible to produce an accurate timing estimate, and hence positional estimate, if one is able to identify/detect the start of a bit edge, and in addition one knows exactly to which bit within the data bit sequence the detected edge belongs. This requires the receiver to 'know' true GPS time to within $\pm\frac{1}{2}$ a bit period, i.e. within $\pm 10$ ms and preferably (for maximum performance and fastest time to fix) within $\pm\frac{1}{2}$ a gold code sequence i.e. $\pm 500$ μs.

The detection of a bit edge requires a lower received signal level than the signal level required to decode the transmitted data stream, and merely requires that the synchronization to the gold code sequence is found. This can be carried out by examining the result of a correlation with the received signal and the gold code sequence. Where two sequential bits have differing values, i.e. the first bit has a '1' value and the second bit a '0' value or vice versa the result of the correlation will suddenly change value at the bit edge passes. As the bit edge and the gold code sequence edge are coherent at this point the determination of the bit edge allows the determination of the gold code sequence edge.

Figure 3:
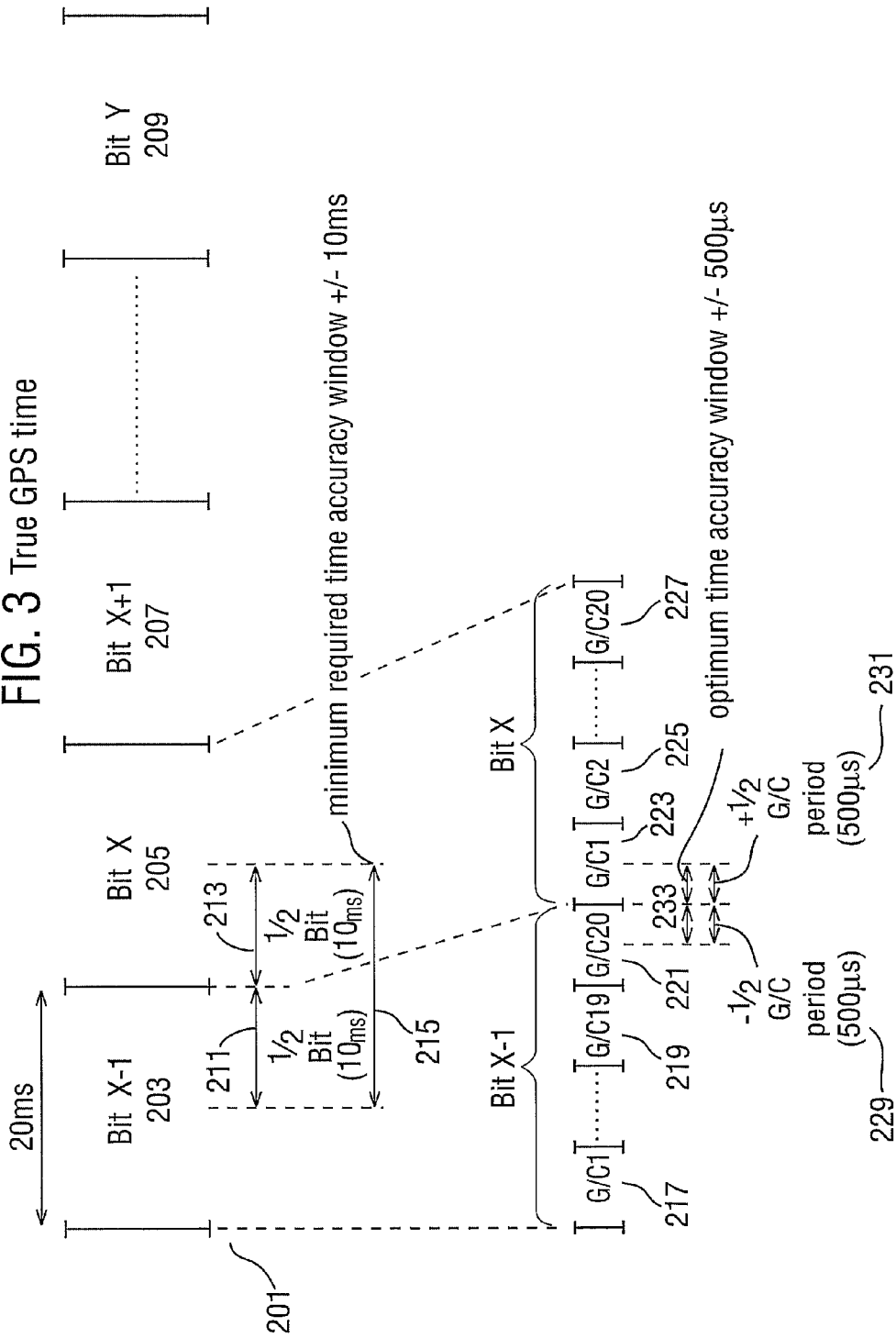
FIG. 3 shows a schematic view of the GPS transmitted bit timings and the associated gold code sequence timings.

The timing of these edges can be seen with reference to FIG. 3. FIG. 3 shows a sequence of GPS bits 201, the bits shown are the three sequential bits x−1 203, x 205, x+1 207 and a further bit y 208. Each bit according to the known art is 20 ms long. The minimum required time accuracy window 215 is shown straddling the x−1'th 203, and x'th 205 bits and is formed from a ½ bit period 211, from the middle of the x−1'th bit to the edge of the x−1'th bit, and a ½ bit period 213 from the start of the x'th bit to the middle of the x'th bit.

FIG. 3 further shows a simplified view of the gold code alongside the GPS signal. For simplicity only the timings of the gold code sequences for the x−1'th and x'th bit are shown. The x−1'th bit gold code timings for the first, penultimate and last gold code sequences are shown, these being G/C-1 217, G/C-19 219, and G/C-20 221. The x'th bit gold code timings for the first, second and last gold code sequences are also shown, these being G/C-1 223, G/C-2 225, G/C-20 227. The x'th bit first gold code sequence follows immediately after the x−1'th bit last gold code sequence. The optimum time accuracy window 233 is formed from a ½ gold code sequence time period 229, from the middle of the x−1'th bit G/C-20 sequence to the edge of the x−1'th bit G/C-20 sequence, and a ½ gold code sequence time period 231 from the start of the x'th bit G/C-1 sequence to the middle of the x'th bit G/C-1 sequence.

The knowledge of exactly to which bit within the data bit sequence the detected edge belongs to can be determined using knowledge of the GPS system. As is known in the art it is possible to use the GPS almanac in order to determine at any specific time where the GPS satellites are currently located and therefore the approximate time delay of the received bit within the +/−10 ms limit. So using a rough GPS time value and knowledge of the location of the GPS satellites it is possible to determine that the received bits from each of the GPS satellites are specific received bits.

The location estimate of the mobile station using the typical GPS system is carried out using a process known as triangulation. This process assumes that a time signal stored by the mobile station 5 and the orbiting satellite 101 is sufficiently accurately synchronized. The pseudorandom timing sequence is transmitted repeatedly from the satellite 101 and received by the mobile station 5. The mobile station 5 then compares the received sequence against the expected sequence in order to determine a timing delay. Using this timing delay and the accurately known position of the satellite at a given GPS system time, the mobile station estimate prescribes a spherical arc along which the mobile station is estimated to be. It is the combination of these arcs that provide an accurate positional estimate. If three satellites can be "seen", providing the estimation system is functioning, the three arcs intersect at two points. If four or more satellites are "seen" then the arcs intersect at a single location—providing a single positional estimate in three dimensional space.

Figure 4:
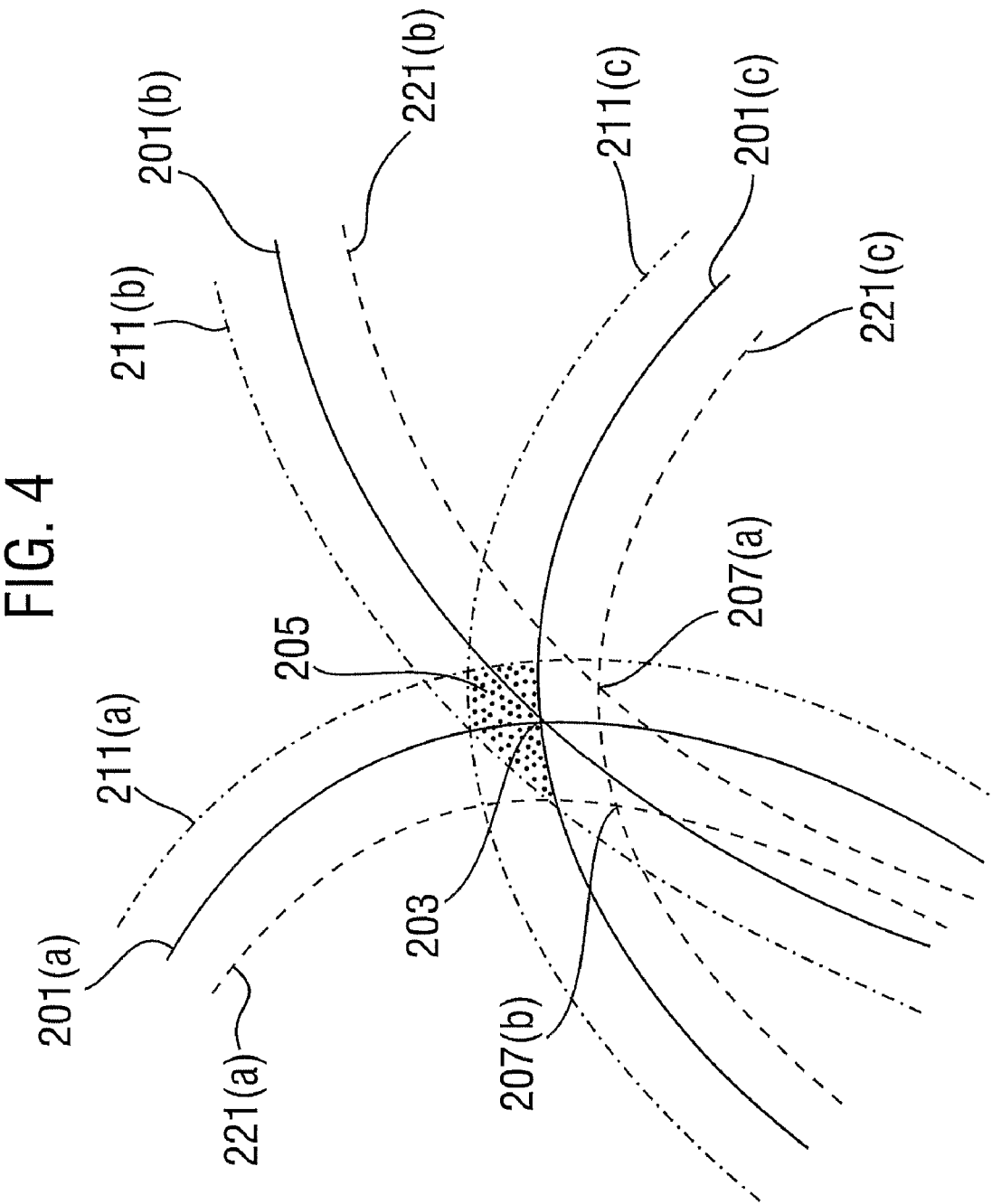
FIG. 4 shows a series of GPS location estimate arcs and error arcs illustrating the GPS system as shown in FIG. 2.

FIG. 4 shows a simplified 2-dimensional schematic view of an ideal situation where three estimated arcs 201(*a*), 201(*b*) and 201(*c*) intersect at a single point 203 indicating a single accurate positional location of the mobile station 5.

As the mobile station internal time is typically accurate to less than several parts per million the synchronization between the mobile station 5 timing and the satellite 101 timing drifts. In such a situation the estimated arcs do not accurately intersect. Two examples of the effects of a timing error are shown in FIG. 3, the first where the estimated location arcs 211(*a*), 211(*b*), 211(*c*) create an error in the form of an overlapping region of estimates within which the mobile station may be located 205. The second example of a timing error shown in FIG. 3 shows where the estimated location arcs 221(*a*), 221(*b*), 221(*c*) describe non-overlapping arcs.

As the synchronization error is almost entirely due to the instability of the mobile station 5 clock relative to the orbiting satellite 101 clocks, the error is the same for each of the location estimates.

Therefore providing the present invention can receive signals from at least four GPS satellites this synchronization error can be cancelled out.

The timing synchronization sequence is not an instantaneous process as discussed above, and is dependent on the signal strength received from the GPS satellite being strong enough so that the necessary information can be extracted.

Figure 5:
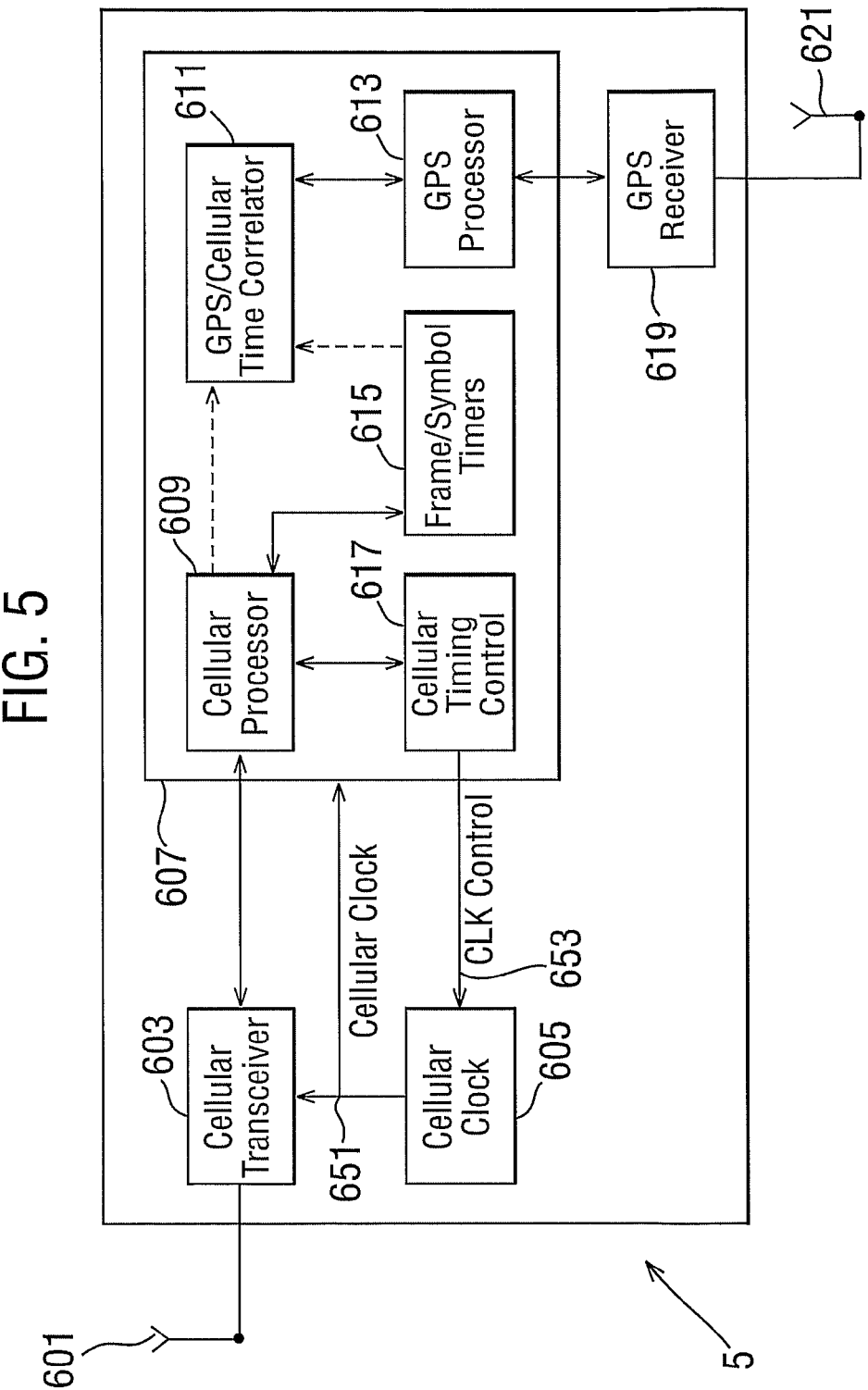
FIG. 5 shows a schematic view of a first embodiment of the present invention incorporated in a mobile station wireless communication transceiver operating within a cellular network as shown in FIG. 1.

With respect to FIG. 5 a first embodiment of the present invention is shown. The mobile station 5 comprises a cellular antenna 601, a cellular transceiver 603, a cellular clock 605, a GPS receiver 619, a GPS antenna 621 and a processing engine 607.

The cellular antenna 601 is connected to the cellular transceiver. The cellular transceiver is further connected to the processor engine 607. The cellular clock 605 is connected to the cellular transceiver and the processing engine 607. The processing engine 607 is further connected to the GPS receiver 619. The GPS receiver is connected to the GPS antenna 621.

The Processing engine 607 further comprises a cellular processor 609, a cellular timing control 617, a frame/symbol timer 615, a GPS/cellular time correlator 611 and a GPS processor 613.

The cellular processor 609 is connected to the cellular timing control 617. The cellular processor is further connected to the frame/symbol timer 615. The cellular processor 609 is further connected to the cellular transceiver 603. Furthermore the cellular processor 609 is connected to the GPS/cellular time correlator 611. The cellular timing control 617 is connected to the cellular clock 605 via a cellular control interconnect 653. The frame/symbol timer 615 is connected to the GPS/cellular time correlator 611. The GPS/cellular time correlator 611 is further connected to the GPS processor 613. The GPS processor 613 is connected to the GPS receiver 619.

Figure 6:
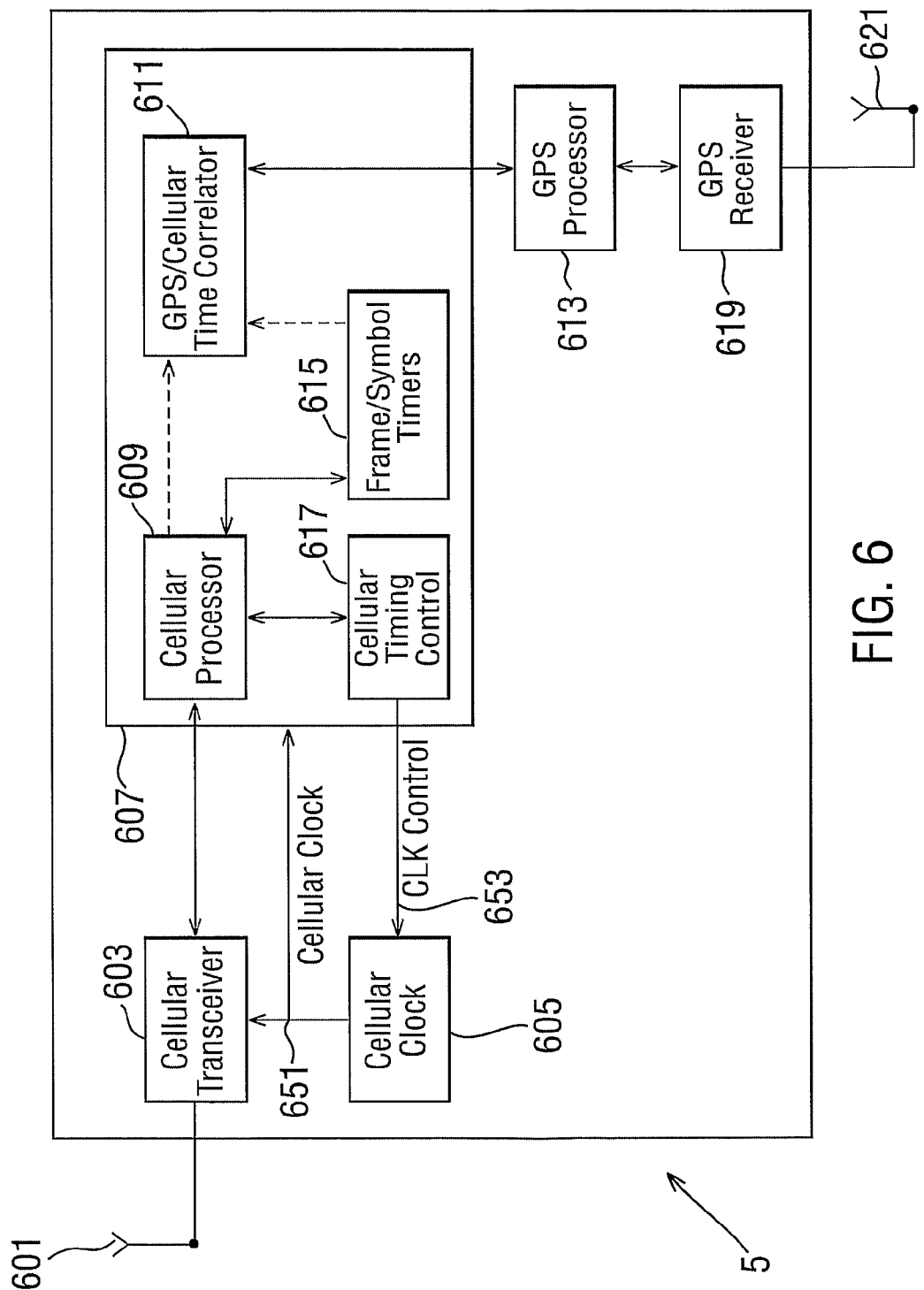
FIG. 6 shows a schematic view of a second embodiment of the present invention incorporated in a mobile station wireless communication transceiver operating within a cellular network as shown in FIG. 1.

With reference to FIG. 6, a second embodiment of the present invention is shown. The second embodiment of the present invention differs from the first embodiment as the GPS processor 613 in the second embodiment is separate from the processing engine 607. The GPS processor 613 however is still connected to the GPS/Cellular time correlator 611 on the processing engine 607 and also to the GPS receiver 619.

It is also appreciated by the person skilled in the art, but not shown in any figure, that any combination of two or three of the three circuits described above can be implemented on a single circuit.

Figure 7:
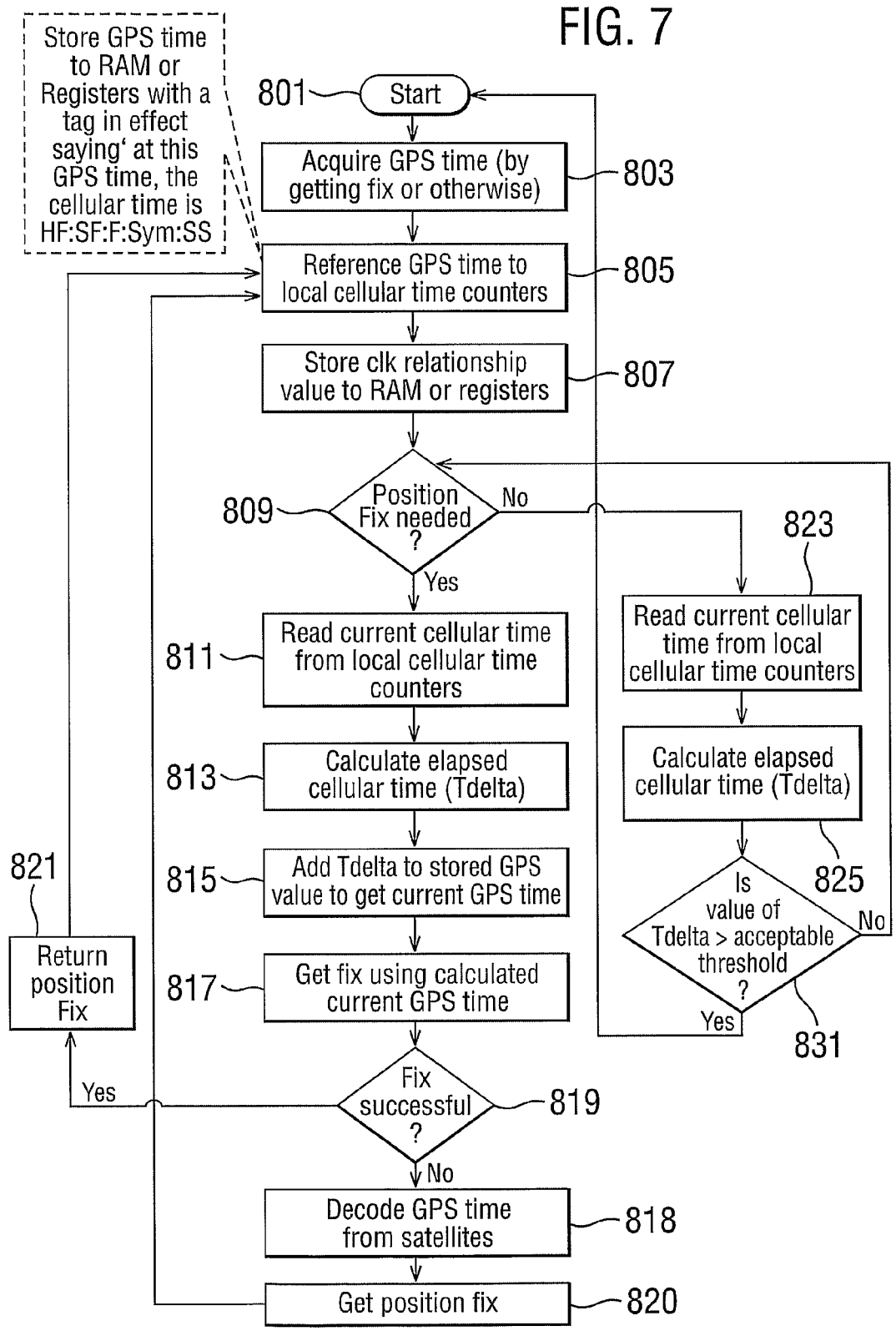
FIG. 7 shows a flow diagram view of the method used in the embodiments of the present invention as shown in FIGS. 5 and 6.

In order to provide more detail for the embodiments of the present invention we shall explain the method of operation of the embodiments with reference to FIG. 7.

In the first step 801 the mobile station 5 is started or rebooted.

In the following step 803 the mobile station acquires the GPS time. In the first embodiment of the present invention the GPS receiver 619 receives the GPS signals. These GPS signals are passed to the GPS processor 613. The GPS processor uses the received bit data and the gold code data in order to accurately acquire the GPS time using the methods as described previously. This GPS time is then passed to the GPS/cellular time correlator 611.

In the following step the GPS/cellular time correlator 611 compares the acquired time from the GPS processor to the cellular time as contained in 615. Thus the GPS time t1 is referenced to a specific cellular time defined as HF:SF:F:Sym:SS. With reference to the European GSM standard HF is the number of the hyper frame, SF the number of the super frames, F the number of the frame, Sym the number of the symbol and SS the number of the sub-slot.

It will be appreciated that for embodiments where the mobile station operates within a telecommunication system other than the GSM system, then the GPS/cellular time correlator compares the acquired time from the GPS processor to the telecommunications 'cellular time' for that telecommunications system.

In the following step 807, the GPS/Cellular time correlator 611 stores the GPS time referenced against the cellular time. In some embodiments of the present invention the values are stored in a memory such as a random access memory (RAM) or a register (not shown).

The mobile station then passes to the next step 809. The next step monitors whether a position fix is required. If a position fix is required then the method passes to step 811. If a position fix is not required the method passes to step 823.

During the time from when the GPS time was acquired and either step 811 or step 823, the cellular transceiver 603 has been receiving and passing cellular event data to the cellular processor. This cellular event data has a well-known and highly accurate time interval. An example of such a cellular event is a start of a frame. This cellular event data is passed to the cellular timing control 617 and the frame/symbol timer 615. The cellular timing control 617 uses this data and an observation of any timing errors in order to fine tune the cellular timer 605 and effectively keep the mobile station accurately synchronized to the base station. The frame/symbol timer 615 keeps a count of how many of these cellular events have occurred.

If a position fix is required the step 811 describes when the cellular processor reads the current cellular time from the frame/symbol timer 615.

Following step 811, step 813 describes when the GPS/cellular time correlator processor 611 calculates the elapsed cellular time (T delta) between the present cellular time and the cellular time at which the acquired GPS time was stored.

Following step 813, step 815 occurs as the GPS/cellular time correlator 611 adds the elapsed cellular time (T delta) to the stored acquired GPS time to get the current GPS time. This information is then passed to the GPS processor 613.

In the step following step 815, step 817 describes when the GPS processor 613 calculates a positional fix using the current GPS time and the current received signals passed from the GPS receiver.

Following step 817, the step 819 occurs when the GPS processor checks to see if the positional fix has been successful. If the fix has not been successful the method passes to step 818 where a full acquisition of the GPS system time from the visible satellites is performed. After this step the method passes to step 820 where a position fix is made and then returned. The mobile station can then proceed to step 805, where the newly acquired GPS time is referenced to the local cellular time counters.

If the fix is successful the method passes to step 821 where the GPS processor returns the positional fix to the process or device within the mobile station 5 that requested the positional fix (not shown). The method then passes back to the step 805, where the current GPS time is referenced to the current cellular time.

When a positional fix is not required the step 823 is carried out. The step 823 occurs when the cellular processor reads the current cellular time from the frame/symbol timer 615.

Following step 823, step 825 describes when the cellular processor 609 calculates the elapsed cellular time (T delta) between the present cellular time and the cellular time at which the acquired GPS time was stored.

Following step 825, in step 831 the GPS/Cellular time correlator 611 determines if the elapsed time is greater than an acceptable threshold. In this way the time is kept fresh.

If the elapsed time is greater than an acceptable threshold then the method is reset back to step 801 whereby there is a re-acquisition/refreshing of the GPS time.

If the elapsed time is less than an acceptable threshold then the method is passed back to step 809, where it checks to see if a position fix request has been received.

The refresh step in another embodiment is triggered when the mobile station 5 is detected to have moved from inside to outside of a building.

This outside trigger can be implemented in one embodiment by detecting when the mobile station has moved after a period of relative static nature. The outside trigger can also be implemented in another embodiment by monitoring the power of the received signals and triggering the outside trigger after a sudden increase in the received power—caused by the reduction in the shielding effect of the building.

Further embodiments of the present invention may trigger a timing refresh step after the mobile station passes between base stations more than a predetermined number of times where the number of times is one or more. In such an embodiment the motion of the mobile station also provides an indication that the mobile station is in the open, in other words not being used inside a building, and is therefore more likely be able to receive GPS signals of a sufficient strength and number to provide a quick and accurate timing synchronization.

Further embodiments of the present invention may trigger a timing refresh step after the received strength or received number of GPS signals detected by the GPS receiver is greater than a desired threshold. In such a situation the opportunity of being able to acquire a timing value quickly and with a high degree of accuracy is worth the extra processing.

Further embodiments of the present invention may trigger a timing refresh step after a combination of at least one of the above trigger events.

As the base station timing signal transmitted is accurate to a fraction of a part per million the copy of the GPS timing sequence stored in the mobile station maintained by the base station timing information is accurate enough to produce accurate location estimates, and acquire the GPS signal accurately for several hours without further adjustment.

In further embodiments of the invention the clock register is kept updated by the auxiliary use of a local cellular reference clock (not shown). The local cellular reference clock comprises means for producing a relatively stable oscillation. In some embodiments of the present invention the local oscillator comprises an accurately tuned crystal clock pulse generator.

In some embodiments of the present invention when the base station 3 timing signal is not received by the cellular transceiver, for instance where the mobile station 5 passes between base stations or is outside of base station range the cellular reference clock can be used to increment the clock register value.

Although the accuracy and stability of the cellular reference clock is not as accurate as the base station clock signal, the cellular reference clock can prevent synchronization being lost completely.

In embodiments of the present invention the mobile station is not required to be actively communicating on a communications channel. The mobile station can observe the paging or control channel timing signals transmitted from the base station in order to acquire accurate timing information.

Furthermore in other embodiments of the present invention any timing differences between different base station clocks are determined by the cellular processor. A mobile station 5 as it moves from one cell to another, requires a process known as handover. As each cell is controlled by a separate base station, the cellular processor can calculate and apply timing adjustments to the mobile station clock registers in order to compensate for timing differences between base stations as the mobile station crosses from one cell to another. These timing adjustments can be small in networks where the base station clocks are partially or substantially synchronized.

The invention claimed is:

1. A device comprising:
   a first circuit arranged to receive at least one first signal and arranged to output first timing information dependent on said first signal;
   a second circuit arranged to receive at least one a second signal and arranged to output second timing information dependent on said second signal; and
   a third circuit arranged to determine timing information of said device, said third circuit arranged to receive at least one of said first and second timing information, and further arranged to produce a third timing information dependent on at least one of said received first and second signals,
   wherein said third circuit is farther arranged to produce a location estimate dependent on said first and third timing information;
   wherein said third timing information is initially synchronised to said first timing information and maintained substantially synchronised to said at least one first signal using said second timing information; and wherein said third circuit further comprises a cellular reference clock and wherein said third timing information is further maintained substantially synchronized to said at least one first signal using said cellular reference clock.

2. A device claimed in claim 1 wherein said first signal comprises a Global Positioning Satellite system signal.

3. A device as claimed in claim 1, wherein said second signal comprises a cellular network control or communications signal.

4. A device as claimed in claim 1, wherein said first timing information comprises at least one of:
a demodulated Global Positioning Satellite system time;
at least one Global Positioning Satellite system pseudo-range;
a demodulated Global Positioning Satellite system timing data word.

5. A device as claimed in claim 1, wherein said second timing information comprises at least one of:
cellular network base station symbol timing;
cellular network base station frame timing.

6. A device as claimed in claim 1, wherein said first circuit comprises a Global Positioning Satellite receiver.

7. A device as claimed in claim 1, wherein said second circuit comprises a cellular network receiver.

8. A device as claimed in claim 1, wherein said third circuit comprises:
a GPS demodulator;
a timing estimator;
a location estimator; and
a clock register.

9. A device as claimed in claim 6, wherein said first circuit further comprises:
a GPS demodulator; and
a timing estimator.

10. A device as claimed in claim 9, wherein said third circuit comprises:
a location estimator and a clock register.

11. A device as claimed in claim 1, wherein said second and third circuit is implemented in a single circuit.

12. A device as claimed in claim 1, wherein said device further comprises a threshold circuit arranged to further substantially synchronise said third timing information to said at least one first signal dependent on a threshold event.

13. A device as claimed in claim 12, wherein said threshold circuit is arranged to further substantially synchronise said third timing information using said first timing information.

14. A device as claimed in claim 12, wherein said threshold event comprises at least one of:
a time period;
a movement of said device out of a building;
a movement of said device following a period of relative static nature;
a determined number of base station handovers;
a received first signal strength threshold;
a number of received first signals.

15. An integrated circuit comprising a GPS device as claimed in claim 1.

16. A device as claimed in claim 8 wherein said clock register comprises random access memory.

17. A method comprising:
receiving at least one first signal;
producing first timing information dependent on said at least one first signal;
receiving at least one second signal;
producing second timing information dependent on said at least one second signal; producing third timing information dependent on said at least one of said first and second timing information;
initially synchronising said third timing information to said first signal, maintaining synchronisation to said first signal using said second timing information, and further maintaining synchronization to said first signal using said cellular reference clock, and
determining a location of said device dependent on said first timing information and said third timing information, wherein said determining step comprises the step of calculating a difference between said third timing information and said first timing information to determine location estimates.

18. A method as claimed in claim 17, wherein receiving at least one first signal comprises; receiving at least four GPS signals.

19. A method as claimed in claim 18, wherein producing at least one first timing information further comprises;
processing said at least four received GPS signals to determine at least four GPS timing signals;
processing said at least four GPS timing signals to produce a true GPS timing signal.

20. A method as claimed in claim 17, wherein receiving at least one second signal comprises;
receiving at least one communications or control signal from a wireless cellular communications system base station.

21. A method as claimed in claim 18, wherein producing said third timing information comprises a further step of triggering a threshold circuit arranged to further substantially synchronise said third timing information to said at least one first signal dependent on a threshold event.

22. A method as claimed in claim 21, wherein triggering said threshold circuit is arranged to further substantially synchronise said third timing information using said first timing information.

23. A method as claimed in claim 21, wherein triggering said threshold circuit further comprised the detection of a threshold event comprising at least one of: a time period;
a movement of said device out of a building;
a movement of said device following a period of relative static nature;
a determined number of base station handovers;
a received first signal strength threshold;
a number of received first signals.

* * * * *